United States Patent
Wu et al.

(10) Patent No.: US 7,602,844 B2
(45) Date of Patent: Oct. 13, 2009

(54) ON-LINE STEP-SIZE CALCULATION USING SIGNAL POWER ESTIMATION AND TONE GROUPING OF THE FREQUENCY-DOMAIN EQUALIZER FOR DMT-BASED TRANSCEIVER

(75) Inventors: Chih-Feng Wu, Taipei (TW); Muh-Tian Shiue, Taipei (TW); Chorng-Kuang Wang, Taipei (TW); An-Yeu Wu, Taipei (TW)

(73) Assignee: National Taiwan University, Taipei (TW)

( * ) Notice: Subject to any disclaimer, the term of this patent is extended or adjusted under 35 U.S.C. 154(b) by 442 days.

(21) Appl. No.: 11/293,139

(22) Filed: Dec. 5, 2005

(65) Prior Publication Data

US 2007/0127563 A1 Jun. 7, 2007

(51) Int. Cl.
*H03H 7/30* (2006.01)
*H03H 7/40* (2006.01)
*H03K 5/159* (2006.01)

(52) U.S. Cl. .................................. 375/229; 375/350
(58) Field of Classification Search ......... 375/229–232, 375/285, 350
See application file for complete search history.

(56) References Cited

U.S. PATENT DOCUMENTS

| | | | | |
|---|---|---|---|---|
| 5,953,380 A | * | 9/1999 | Ikeda | 375/346 |
| 5,978,824 A | * | 11/1999 | Ikeda | 708/322 |
| 6,223,194 B1 | * | 4/2001 | Koike | 708/322 |
| 6,285,768 B1 | * | 9/2001 | Ikeda | 381/71.11 |
| 6,389,062 B1 | | 5/2002 | Wu | |
| 6,389,084 B1 | * | 5/2002 | Rupp | 375/343 |
| 6,608,864 B1 | * | 8/2003 | Strait | 375/233 |
| 6,785,328 B2 | * | 8/2004 | Harikumar et al. | 375/232 |
| 6,907,064 B1 | * | 6/2005 | Tokunaga et al. | 375/232 |
| 2005/0143973 A1 | * | 6/2005 | Taniguchi et al. | 704/200.1 |

OTHER PUBLICATIONS

On-Line Step-Size Calculation Using Signal power Estimation-Tone Grouping for Frequency-Domain Equalizer of DMT-Based Systems, Chih-Feng Wu, et al., 2004 IEEE Asia-Pacific Conference on Circuits and Systems, Dec. 6-9, 2004.

* cited by examiner

*Primary Examiner*—Jean B Corrielus
(74) *Attorney, Agent, or Firm*—Rosenberg, Klein & Lee

(57) ABSTRACT

An efficient method for calculating the step-sizes for a frequency-domain equalizer of a discrete-multitone communications system using signal power estimation and tone grouping (SPE-TG) while on-line. The SPE-TG method is used to calculate a plurality of subchannel step-sizes which are then stored in a lookup table. When on-line, the method uses signal power estimation to select step sizes for each tone, and uses these step sizes for frequency domain equalization. The SPE-TG method simplifies the calculations necessary for frequency domain equalization, thereby saving significant hardware and/or processing resources. The SPE-TG method is reliable and robust, and does not depend upon assumptions about the line, location, or channel.

15 Claims, 8 Drawing Sheets

ON-LINE STEP-SIZE CALCULATION USING SIGNAL POWER ESTIMATION AND TONE GROUPING OF THE FREQUENCY-DOMAIN EQUALIZER FOR DMT-BASED TRANSCEIVER

BACKGROUND OF THE INVENTION

1. Field of the Invention

The present invention relates to high-speed modem telecommunications. More specifically, the present invention discloses a method for efficiently calculating the step-sizes for a frequency domain equalizer in a discrete-multitone communications system.

2. Description of the Prior Art

Frequency domain equalization (FEQ) for discrete multitone (DMT) communications systems has involved separate processes for gain equalization (GE) and phase equalization (PE). In digital subscriber line (DSL) systems, FEQ must be performed when the communications are occurring, since each subscriber loop, typically twisted pair line, has individual characteristics for attenuation and frequency response due to bridge taps, outside interference, length of the line, and other factors. The frequency responses of several real-world ADSL loops are shown in chart form in FIG. 2. FEQ is performed during the training phase as the DSL modems on each end of the twisted pair line negotiate to determine the subchannel signal to noise ratio (SNR) and bit allocation.

Please refer to FIG. 7, which shows a block diagram of a typical DMT-based communications system. A time-domain equalizer TEQ shortens the channel dispersion to minimize intersymbol interference (ISI) caused by channel distortions such as loop length, gauge change, and bridge taps. Although TEQ can minimize ISI in the time domain, phase rotation and amplitude attenuation in the frequency domain still exist on each subchannel. To overcome these distortions, an FEQ is used to compensate for the phase and amplitude distortions on each subchannel.

However, existing methods for calculating FEQ are complex and use significant processing resources, either in software computing cycles or in specialized hardware such as high performance DSPs. One such prior art frequency domain equalization method is disclosed in U.S. Pat. No. 6,389,062 by Wu. The method uses two equalizers, a phase equalizer (PE) and a gain equalizer (GE), in order to implement frequency domain equalization. A block diagram of this prior art method is shown in FIG. 1. The FEQ input $Y_k$ is processed by gain equalizer GE and phase equalizer PE.

In addition, the step-size used by the FEQ for training is a constant chosen through off-line simulation at the time of hardware design, with many uncertain issues left unresolved, and thus, the signal to noise ratio (SNR) under real-world conditions cannot be compensated for, resulting in larger net errors in phase and amplitude corrections, reducing real-world efficacy and reliability during negotiation.

Therefore there is need for improvement in frequency domain equalization for DMT-based communications systems to overcome the uncertainty of the prior art.

SUMMARY OF THE INVENTION

To achieve these and other advantages and in order to overcome the disadvantages of the prior art method in accordance with the purpose of the invention as embodied and broadly described herein, the present invention provides an improved method for on-line calculation of step size for DMT-based communications systems using signal power estimation and tone grouping (SPE-TG), the method being able to keep SNR losses below a user selectable limit of L-dB per tone, with L being a value chosen during design. The method predetermines a lookup table containing a set of step sizes to use for each tone, groups tones according to signal power estimation during the training period, and selects appropriate step sizes for each group, thereby keeping SNR losses to within a known, user-selectable, predetermined limit, which is compensated for with a system parameter, gain scaling, if the predetermined limit is chosen to be under 2.5 dB.

The present invention further provides for a reduction in computational complexity as compared to the prior art, using a single equalizer.

These and other objectives of the present invention will become obvious to those of ordinary skill in the art after reading the following detailed description of preferred embodiments. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
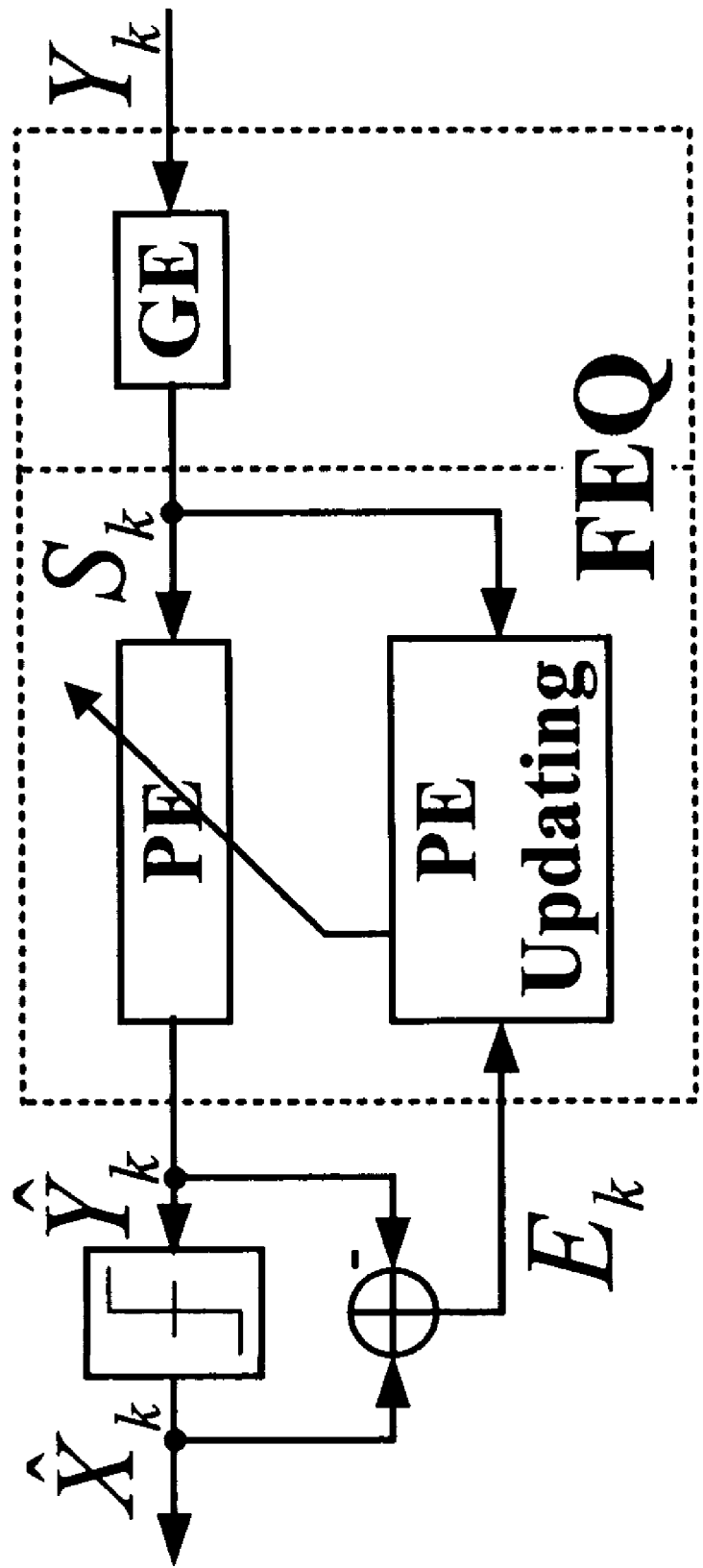
FIG. 1 is a block diagram of a prior art FEQ method.
Figure 2:
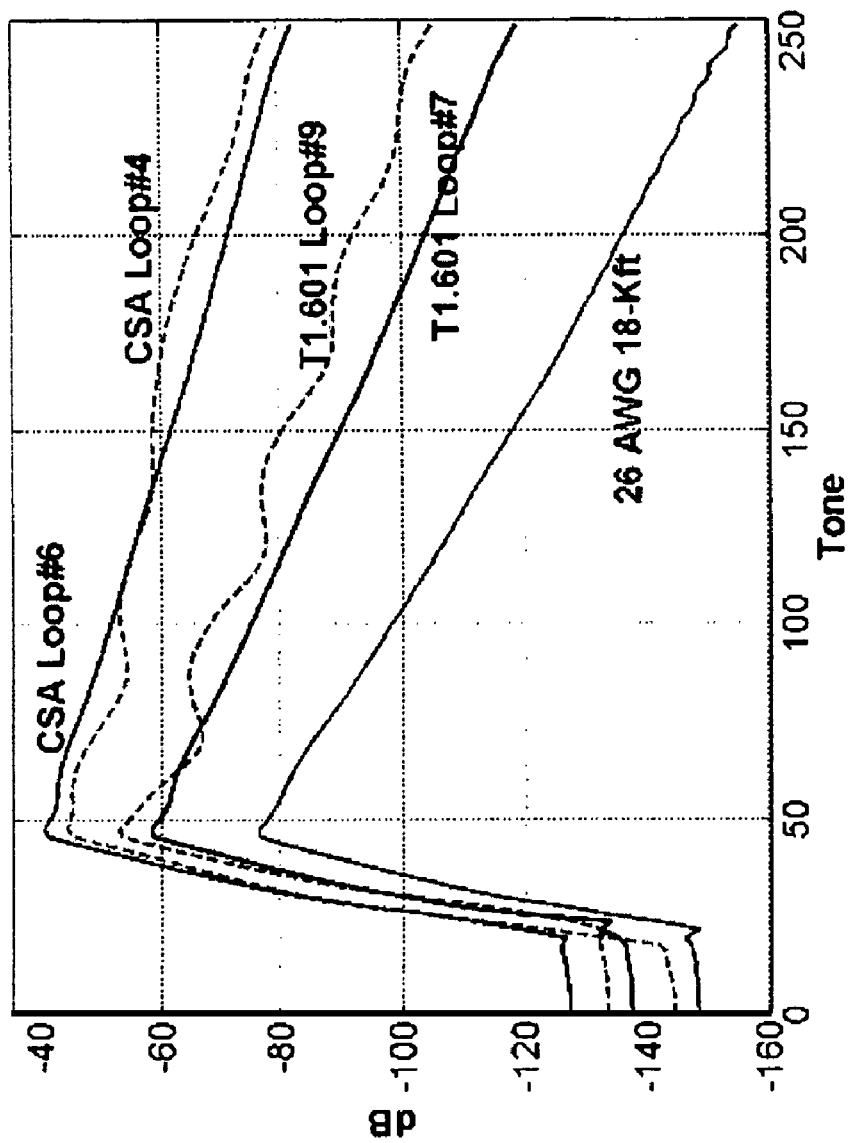
FIG. 2 is a chart showing the frequency response of several sample ADSL channels under various real-world conditions.

Reference will now be made in detail to the preferred embodiments of the present invention, examples of which are illustrated in the accompanying drawings. Wherever possible, the same reference numbers are used in the drawings and the description to refer to the same or like parts.

According to Widrow et al., "Stationary and Nonstationary Learning Characteristics of the LMS Adaptive Filter," Proceedings of the IEEE, vol. 64 no. 8, pp 1151-1162 (incorporated herein by reference), the bound of the step-size is inversely proportional to the total of tap signal input power, and must satisfy the criteria:

$$0 < \mu < \frac{2}{\text{total of tap signal input power}} \quad \text{(eq 1)}$$

Essentially, the LMS algorithm is an instantaneous estimation to approximate the exact gradient for adaptation. The instantaneous gradient estimation leads to the gradient noise, which gives rise to the misadjustment. Therefore, considering the misadjustment effect, the criteria of (eq 1) can be reformulated as:

$$\mu \cong \frac{2M}{\text{total of tap signal input power}} \quad \text{(eq 2)}$$

where M is the amount of the misadjustment.

In addition, the number of iterations for convergence, $\tau_{MSE}$, can be defined as $$\tau_{MSE} \cong \frac{1}{4 \cdot M} \quad \text{(eq 3)}$$

Consequently, a large step-size will lead to a large misadjustment but a short convergence time. Conversely, a small step-size will lead to a small misadjustment but a long convergence time. Thus, the choice of step-size involves a tradeoff between misadjustment and convergence time. From the perspective of managing the SNR, it is desirable to reduce the misadjustment, thus improving SNR, while also keeping convergence time at about the same level for each subchannel. However, channel characteristics differ from loop to loop and from subchannel to subchannel, depending on the individual characteristics of each subscriber loop (twisted pair line).

The SNR loss which results from the misadjustment, L, expressed in dB, can be determined by the system designer. If L is chosen to be less than 2.5-dB, the SNR loss can be compensated for using a system parameter, $g_k$. The $g_k$ parameter provides for adjustment from −2.5 to 2.5 dB, as defined in G.992.1 (ADSL), G.992.3 (ADSL2), G.992.5 (ADSL2+) and G.vdsl (VDSL). Therefore, the subchannel step-size can be calculated by:

$$\mu_k \cong \frac{\eta}{\text{average input signal power on } k\text{th subchannel}} \quad \text{(eq 4)}$$

where eta, η, is 2M, and is obtained from the L parameter; for example, if L is chosen to be less than 0.25-dB, then η is equal to 0.118. Furthermore, the corresponding convergence time, per (eq 3), is then:

$$\tau_k \cong 5 \text{ iterations} \quad \text{(eq 5)}$$

(eq 4) is of O(N) for the number of subchannels, i.e., it can be implemented in linear time with $N_{SC}$ division operations for $N_{SC}$ subchannels. However, (eq 4) implies that having equal average input signal power leads to having the same step-size. This in turn leads to the use of tone grouping to design the updating step-size based upon the average input signal power.

Figure 4:
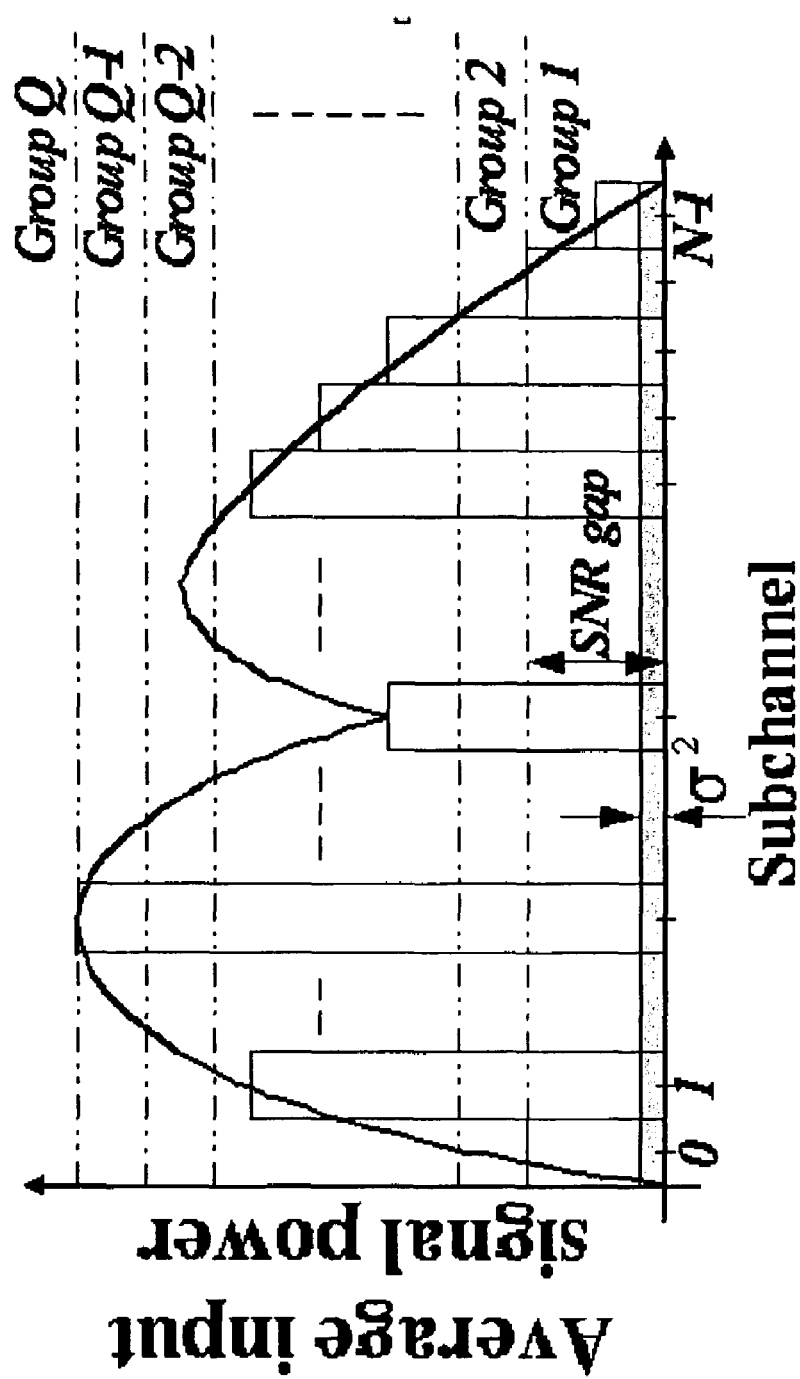
FIG. 4 is a chart showing the frequency response of the target channel of an example ADSL channel as analysed by the method of the present invention.

Please refer to FIG. 4. From the received signal power point of view, the target channel frequency response can be sliced horizontally into Q blocks to group the subchannels by average input signal power. Tones whose average input signal power levels are within the same block then use the same step size.

As described in the paper "On-Line Step-Size Calculation Using Signal Power Estimation—Tone Grouping for Frequency Domain Equalizer of DMT-Based Systems" by Wu et al. (the present inventors), 2004 IEEE Asia-Pacific Conference on Circuits and Systems, December 2004, and incorporated herein by reference, based on the SPE-TG approach, the subchannel step size as given in (eq 4) can be described by:

$$\mu_k \cong \frac{\eta}{|Y_k|^2} = \frac{\eta}{G_k^2[(2^b-1)\Gamma_T]\tilde{\sigma}_k^2}, \quad \text{(eq 6)}$$

where: $Y_k$ and $\tilde{\sigma}_k$ express the DFT output (FEQ input) and the standard deviation of the baseband equivalent channel noise on the k-th subchannel respectively; $G_k$ represents the equivalent gain of the converged TEQ on the k-th subchannel; $\Gamma_k$ denotes the total SNR gap including the SNR gap, system design margin and coding gain in power sense; and b is the value of the bit-allocation. Without losing the generality, $G_k$ is considered the same for each subcarrier. Therefore, $G=G_k$ and $k=0, 1, \ldots, N_{SC}-1$. Also, practically, all of the subchannels have the equivalent AWGN. Consequently, $\tilde{\sigma}=\tilde{\sigma}_k$ and $k=0, 1, \ldots, N_{SC}-1$.

Therefore the subchannel step-size can be further simplified to tone-grouping step-size, $\mu_i$. The $\mu_i$ is given by:

$$\mu_i = \frac{\eta}{G^2[(2^b-1)\Gamma_T]\tilde{\sigma}^2}, \quad b: 2 \sim 16, \quad i: 1 \sim 15 \quad \text{(eq 7)}$$

Figure 3:
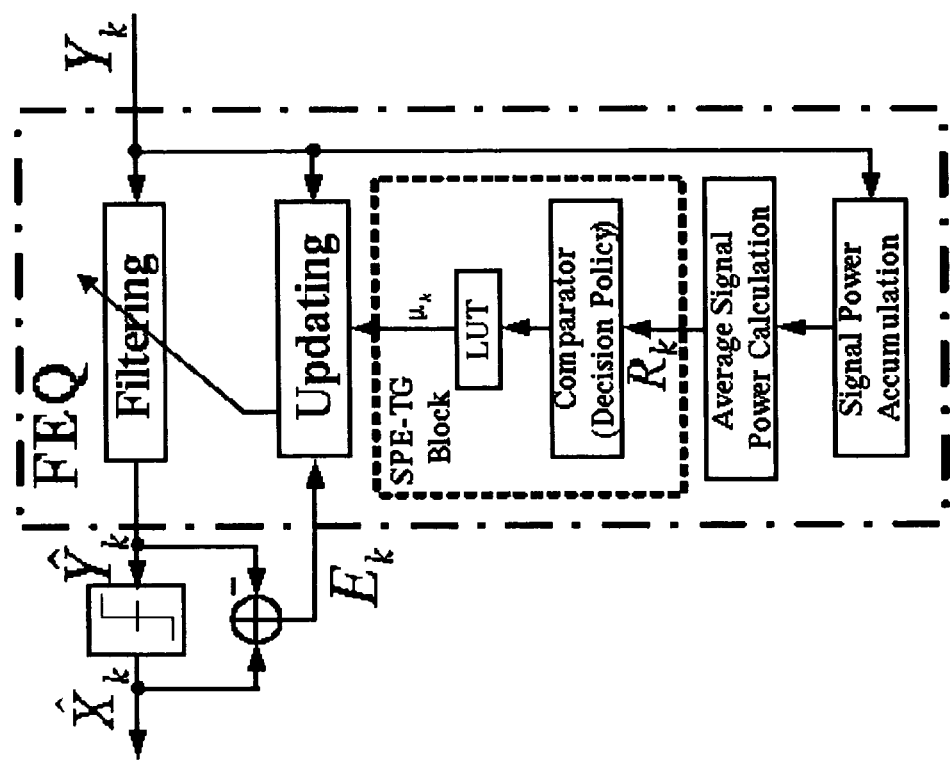
FIG. 3 is a block diagram of the FEQ method of the present invention.

Please refer to FIG. 3, a block diagram showing a representation of the method of the present invention. The FEQ utilizes the method of the present invention to update the step size for each subchannel in the updating hardware of the frequency domain equalizer.

Figure 5:
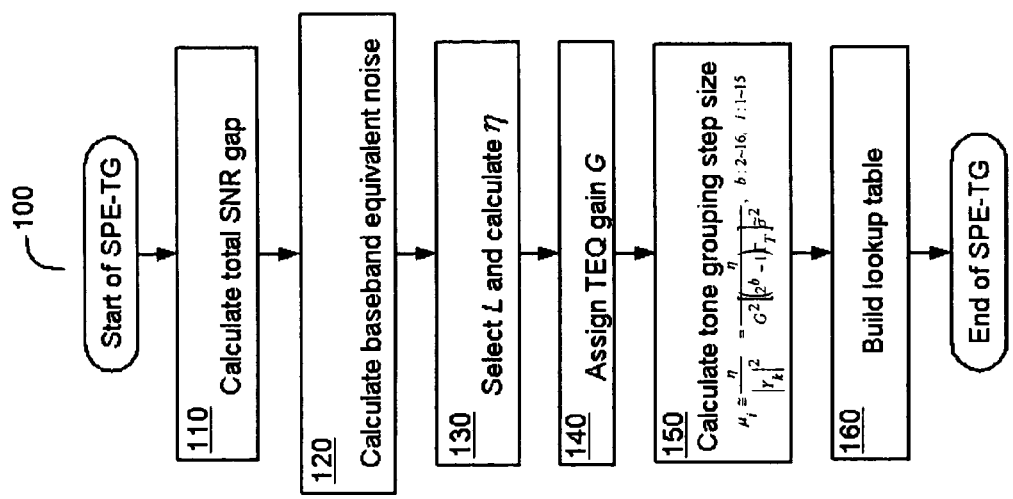
FIG. 5 is a flowchart of an embodiment of the table generation method of the present invention.

Referring to FIG. 5, the method 100 for generating the lookup table comprises the following steps:

Step 110: for each subchannel from 0 to $N_{SC}-1$, calculate $\Gamma_T$ as a function of the design parameters: SNR gap ($\Gamma$), design margin ($\gamma_m$) and coding gain ($\gamma_c$);

Step 120: for each subchannel from 0 to $N_{SC}-1$, calculate $\tilde{\sigma}$ from BW, AWGN (−140 dBm/Hz) and receiver input impedance R (100-Ω);

Step 130: using the user-determined L parameter, calculate η

Step 140: assign the gain G;

Step 150: for each group number from 1 to 15, calculate the step size $\mu_i$, where i is the group number 1 to 15.

Step 160: build a lookup table according to the results of Step 150.

In the method 100, b is not limited to less than 15 and its range is from 2 to 16 inclusive; furthermore G is typically kept within the practical range of about 0.5~1.5.

Based on the method 100 above, an SPE-TG lookup table (LUT), described in Table 1, can be constructed with the assumptions of a 9.8-dB SNR gap, a 6-dB design margin, and a 0-dB coding gain. In addition, L is assumed to be less than 0.25-dB, resulting in η being equal to 0.118. From the VLSI implementation point of view, to simplify the necessary hardware, the step-size can be implemented as a power of two, listed in the fourth column of Table 1. Results of using the power of two approximations, shown in Table 2, are discussed below. Finally, there are 15 tone-groupings with power of two step-sizes ranging from $2^6$ to $2^{-8}$.

TABLE 1

Proposed SPE-TG Lookup Table.

| b | Signal Power $P_i, 1 \leq i \leq 15$ | Floating Step-size $\mu_{flt, STE-TG}$ $\mu_i, 1 \leq i \leq 15$ | Power of 2 Step-size $\mu_{po2, STE-TG}$ $\mu_i, 1 \leq i \leq 15$ | Group Number |
|---|---|---|---|---|
| $\leq 2$ | 0.00100735 | 117.64279645 | $2^6$ | 1 |
| 3 | 0.00235048 | 50.41834133 | $2^5$ | 2 |
| 4 | 0.00503674 | 23.52855929 | $2^4$ | 3 |
| 5 | 0.01040928 | 11.38478675 | $2^3$ | 4 |
| 6 | 0.02115434 | 5.60203793 | $2^2$ | 5 |
| 7 | 0.04264447 | 2.77896370 | $2^1$ | 6 |
| 8 | 0.08562473 | 1.38403290 | $2^0$ | 7 |
| 9 | 0.17158525 | 0.69066221 | $2^{-1}$ | 8 |
| 10 | 0.34350629 | 0.34499354 | $2^{-2}$ | 9 |
| 11 | 0.68734836 | 0.17241250 | $2^{-3}$ | 10 |
| 12 | 1.37503251 | 0.08618520 | $2^{-4}$ | 11 |
| 13 | 2.75040080 | 0.04308734 | $2^{-5}$ | 12 |
| 14 | 5.50113739 | 0.02154235 | $2^{-6}$ | 13 |
| 15 | 11.00261056 | 0.01077085 | $2^{-7}$ | 14 |
| $\geq 16$ | 22.00555691 | 0.00538534 | $2^{-8}$ | 15 |

Figure 6:
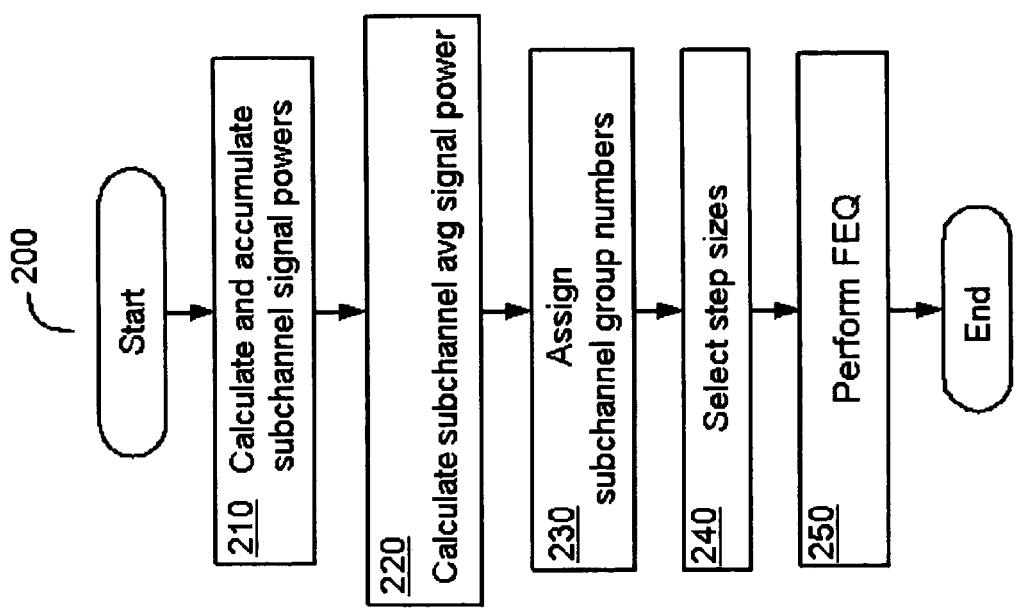
FIG. 6 is a flowchart of an embodiment of the on-line method of the present invention.
Figure 7:
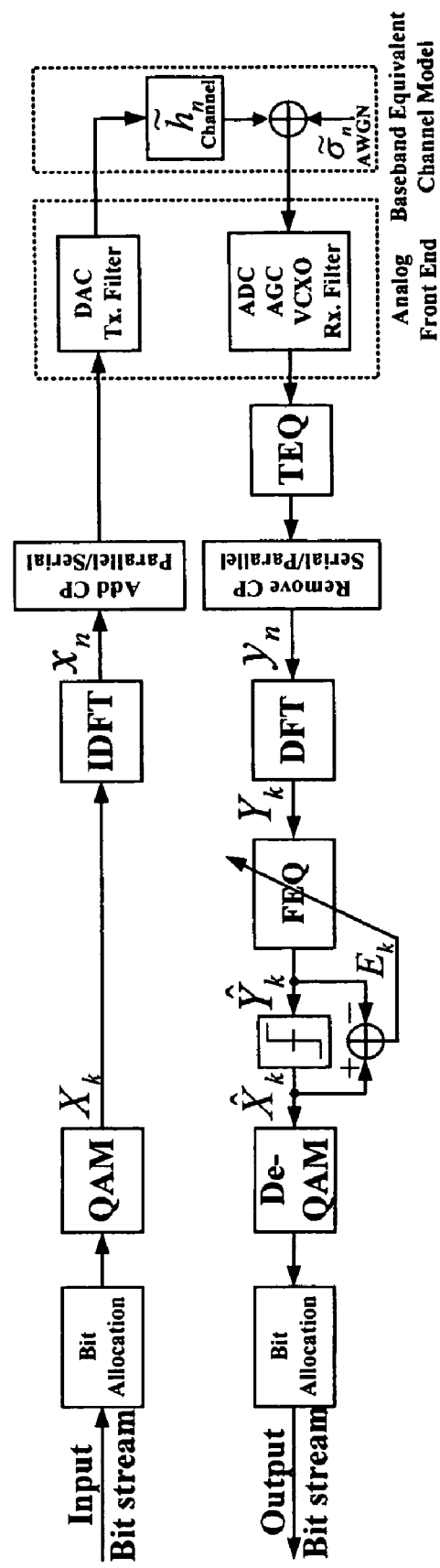
FIG. 7 is a block diagram of a typical DMT-based communications system.

Referring to FIG. 6, a flowchart of an embodiment of the method of the present invention, the on-line method 200 comprises the following steps:

Step 210: for each subchannel from 0 to $N_{SC}-1$, calculate and accumulate the subchannel signal power, $$|Y_k|^2$$

Step 220: calculate the subchannel average signal power $R_k$

Step 230: assign a group number to each subchannel using a decision policy based on the power threshold values in column two of Table 1.

Step 240: for each subchannel from 0 to $N_{SC}-1$, select the step size $\mu_i$ for k-th subchannel according to the decision policy.

Step 250: perform FEQ using the step sizes determined in Step 240.

The decision policy of step 230 is described as follows:
 i) $R_k \geq P_{15}$, $\mu_k = \mu_{15}$
 ii) $P_i \leq R_k \leq P_{i+1}$, $\mu_k = \mu_i$, for i=1, 2, ..., 14
 iii) $R_k < P_1$, $\mu_k = \mu_1$ where k and i are the index of the subchannel and group respectively; $R_k$ and $\mu_k$ represent the average received signal power and step-size of the k-th subchannel respectively; and $P_i$ and $\mu_i$ express the threshold value of the received signal power and step-size of the ith group respectively. The group step-sizes from $\mu_1$ to $\mu_{15}$ are stored in the LUT, which is obtained from method 100.

Figure 8:
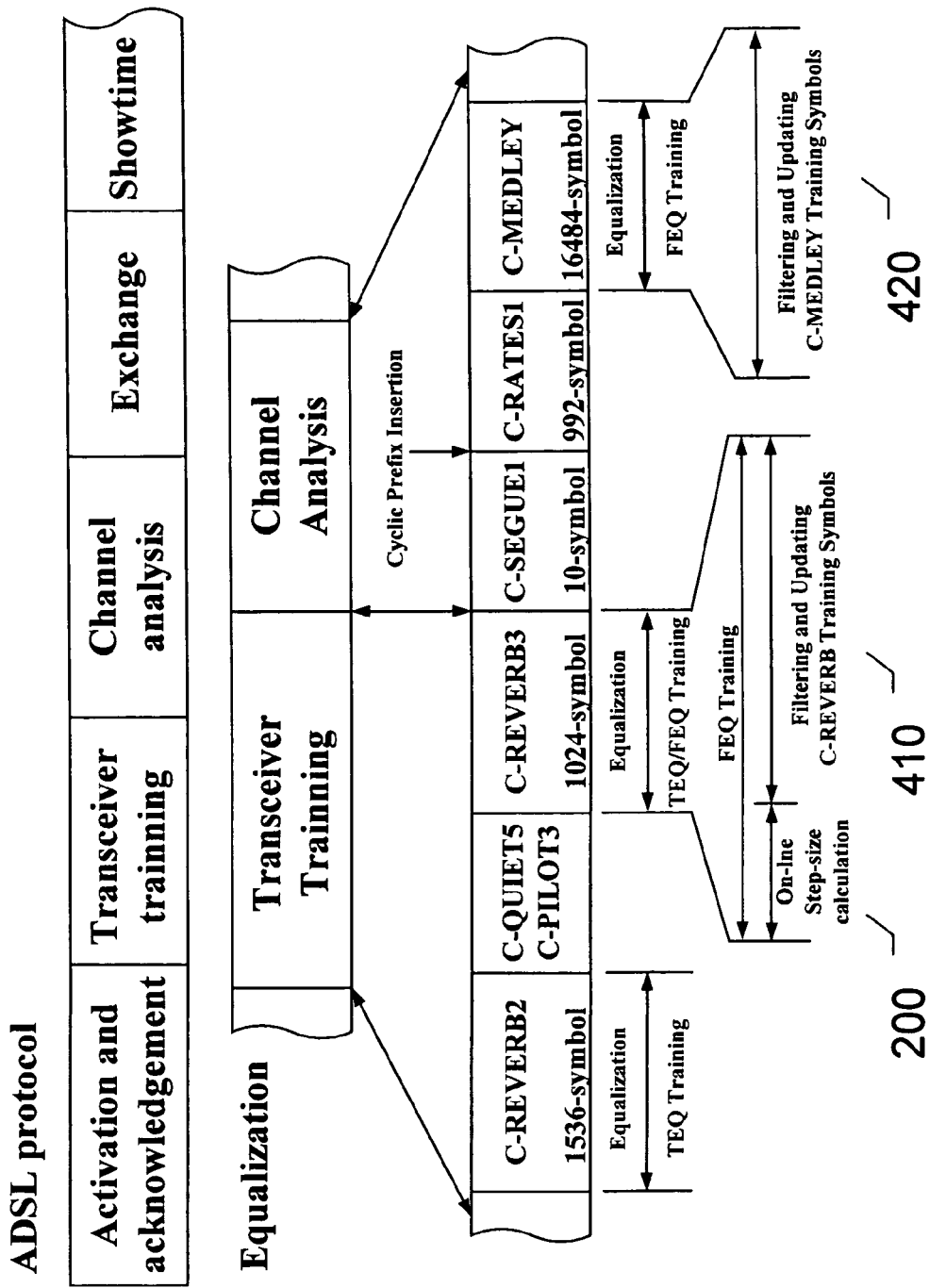
FIG. 8 is a diagram illustrating the relationship of the method of the present invention to the training phases of signal negotiation between a pair of DMT-based modems.

Please refer to FIG. 8, a diagram illustrating the relationship of the method of the present invention to the training phases of signal negotiation between a pair of DMT-based modems. The diagram illustrates an example using ADSL protocol. However, the present invention can be utilized with various protocols such as ADSL, ADSL2, ADSL2+, VDSL, or other type of protocol.

The initial protocol comprises a sequence of steps, including transceiver training. Transceiver training, in turn, comprises a sequence of steps defining exchange of known data so that line conditions can be determined. The relationship of the preferred embodiment of the method of the present invention is shown, with the step-size calculation of method 200 preferentially being performed during the beginning of the FEQ segment of the C-REVERB3 exchange during the transceiver training period. The results of the step-size calculation are subsequently used during the filtering and updating portions 410,420 of the FEQ training of the C-REVERB3 exchange and C-MEDLEY exchange respectively, as well as during any adaptation periods which may occur later.

The method of the present invention can be implemented either in software or in hardware. A lookup table can be used for storing the step sizes of Table 1 to speed calculations. In hardware, the method is realized with components for signal power accumulation, average signal power calculation, comparator (decision policy), look-up table (ROM table), filtering, updating, and error estimation. Power of two step-sizes can be substituted for the floating-point calculations to further simplify implementation in software or hardware, further reducing computational overhead with only a small difference in efficiency. Referring to Table 2, the resulting data rate difference between using the floating-point calculation and the integer calculation is less than ±0.21%.

TABLE 2

Data rate comparison between $\mu_{flt}$ and $\mu_{po2}$

| | | SPE-TG | | |
|---|---|---|---|---|
| Test Loop | $\mu_{flt}$ | $\mu_{flt, SPE-TG}$ | $\mu_{po2, SPE-TG}$ | $\epsilon$ |
| | REVERB/MEDLEY (kbps) | | | |
| T1.601 Loop #7 | 3096/3020 | 3076/3000 | 3096/3020 | 0.00% |
| T1.601 Loop #9 | 4204/4024 | 4184/4000 | 4212/4032 | 0.19% |
| T1.601 Loop #13 | 3896/3764 | 3900/3752 | 3916/3772 | 0.21% |
| CSA Loop #4 | 9528/8620 | 9488/8640 | 9516/8616 | −0.04% |
| CSA Loop #6 | 9048/8720 | 9016/8672 | 9052/8712 | −0.09% |
| CSA Loop #7 | 8992/8692 | 8968/8672 | 8988/8696 | 0.04% |
| CSA Loop #8 | 8324/7840 | 8394/7796 | 8324/7832 | −0.10% |
| mid-CSA Loop | 12144/11304 | 12132/11288 | 12140/11304 | 0.00% |

In comparison to the prior art, the method of the present invention uses only a single equalizer rather than a plurality of equalizers, thereby using significantly fewer computational resources and reduced hardware complexity. The present invention also compensates for actual subscriber loop conditions, as opposed to relying on the uncertainties of off-line simulations and field trials, which are unable to take into account the highly individual conditions of each real-world subscriber loop.

TABLE 3

Comparison between present invention and method of U.S. Pat. No. 6,389,062

| Item | U.S. Pat. No. 6,389,062 | SPE-TG method |
|---|---|---|
| FEQ Architecture | GE plus PE | Single Equalizer |
| Updating | GE Direct-form PE LMS algorithm, | Amplitude and phase updating together with LMS algorithm |
| Computing Complexity | GE 2-real "mul" PE 8-real "mul" | 8-real "mul" |
| Step-size | Single step-size predetermined by off-line simulation | 15 step-size groups predetermined by SPE-TG and calculated on-line for each tone |
| Performance | uncertain issues which depend on simulation model and field trial | $SNR_k$ loss less than 0.25-dB which can be compensated for by $g_k$ |

The method of the present invention thus provides a significant improvement over prior art methods, resulting in faster convergence, simpler implementation, and improved adaptation to real-world subscriber loop conditions.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method for realizing a frequency-domain equalizer in a Discrete Multitone (DMT) communications system comprising the steps of:
   generating a plurality of step sizes; said step of generating comprising the steps of:
      selecting a signal to noise ratio gap value responsive to a received signal power and a tone group for a target channel of a DMT transceiver;
      selecting a design margin value consistent with said DMT transceiver characteristics and in accordance with said signal to noise ratio gap value;
      selecting a coding gain value corresponding to a signal to noise ratio of said received signal power;
      calculating a baseband equivalent noise standard deviation value of a subchannel of said target channel;
      selecting a signal to noise ratio loss value, said value proportional to a misadjustment parameter of a Least Means Squared (LMS) calculation; and
      selecting a subchannel equivalent gain value of said subchannel;
   storing the plurality of step sizes in a lookup table;
      selecting a step size of the subchannel from the plurality of step sizes in the lookup table according to said received signal power while on-line; and
   applying the step size to the frequency-domain equalizer.

2. The method of claim 1 wherein the step of selecting the step size of the subchannel further comprises the steps of:
   determining an eta value; $\eta$, from the signal to noise ratio loss value;
   wherein said eta value is a scaling factor of the reciprocal of a total of tap signal input power, and derivable from said misadjustment parameter;
   calculating a subchannel average input signal power value; and
   dividing the eta value by the subchannel average input signal power value.

3. The method of claim 1 wherein the step of generating the plurality of step sizes further comprises the step of calculating a value:

$$\mu_k = \frac{\eta}{G_k^2[(2^b - 1)\Gamma_T]\tilde{\sigma}_k^2}$$

where $\mu_k$ is the step size, $\eta$ is a scaling factor of the reciprocal of a total of the tap signal input power derivable from said misadjustment parameter, $G_k^2$ is the square of the subchannel equivalent gain value, $(2^b-1)\Gamma_T$ represents a scaling factor wherein b is bit allocation value having an integer value between and including 2~16 and $\Gamma$ is the signal to noise ratio gap value, and $\tilde{\sigma}_k^2$ is the square of the baseband equivalent noise standard deviation value.

4. The method of claim 1 further comprising the step of:
   approximating the plurality of step sizes as powers of two.

5. The method of claim 1 wherein selecting the step size of the subchannel from the plurality of step sizes in the lookup table according to said received signal power while on-line comprises the steps of:
   calculating a received signal power accumulation;
   calculating an average received signal power;
   comparing the average received signal power to a plurality of threshold values stored in the lookup table;
   when a threshold value of the plurality of threshold values is greater than the average received signal power value, selecting the subchannel step size associated with a chosen threshold value of the lookup table where the average received signal power is greater than or equal to the chosen threshold value and where the average received signal power is less than all threshold values in a set of a plurality of threshold values larger than the chosen threshold value;
   when each threshold value of the plurality of threshold values is less than the average received signal power value, selecting a maximum subchannel step size; and
   when each threshold value of the plurality of threshold values is greater than the average received signal power, selecting a minimum subchannel step size.

6. A method for realizing a frequency-domain equalizer in a Discrete Multitone (DMT) communications system comprising the steps of:
   generating a plurality of step sizes for a plurality of subchannels of a modem;
   storing the plurality of step sizes in a lookup table; and
   applying the plurality of step sizes to the frequency-domain equalizer; said step of generating comprising the steps of:
      selecting a signal to noise ratio gap value responsive to a received signal power for a target channel and a tone group of said modem;
   selecting a design margin value consistent with said modem characteristics and in accordance with said signal to noise ratio gap value;
   selecting a signal to noise ratio loss value, said value corresponding directly to a misadjustment parameter of a Least Means Squared (LMS) calculation; and
   selecting a coding gain value corresponding to a signal to noise ratio of said received signal power.

7. The method of claim 6 wherein the step of generating the plurality of step sizes further comprises the steps of:
   calculating a baseband equivalent noise standard deviation value of a subchannel of said target channel; and
   calculating a subchannel equivalent gain value of said subchannel.

8. The method of claim 7 wherein the step of calculating the subchannel equivalent gain value further comprises:
   determining an eta value, $\eta$, from the signal to noise ratio loss value;
   calculating a subchannel average input signal power value; and
   dividing the eta value by the subchannel average input signal power value.

9. The method of claim 8 wherein the step of generating the plurality of step sizes further comprises calculating a value:

$$\mu_k = \frac{\eta}{G_k^2[(2^b - 1)\Gamma_T]\tilde{\sigma}_k^2}$$

where $\mu_k$ is the step size, $\eta$ is a scaling factor of the reciprocal of a total of the tap signal input power derivable from said misadjustment parameter, $G_k^2$ is the square of the subchannel equivalent gain value, $(2^b-1)\Gamma_T$ represents a scaling factor wherein b is bit allocation value having an integer value 2~16 inclusive and $\Gamma$ is the signal to noise ratio gap value, and $\tilde{\sigma}_k^2$ is the square of the baseband equivalent noise standard deviation value.

10. The method of claim 6 further comprising the step of: approximating the plurality of step sizes as a plurality of powers of two.

11. The method of claim 6 wherein the plurality of step sizes is stored as integer powers of two in the lookup table.

12. The method of claim 6 wherein the step of selecting the step size of the subchannel from the plurality of step sizes in the lookup table according to a received signal power while on-line comprises the steps of:
    calculating a received signal power accumulation;
    calculating an average received signal power;
    comparing the average received signal power to a plurality of threshold values stored in the lookup table;
    when a threshold value of the plurality of threshold values is greater than the average received signal power value, selecting the subchannel step size associated with a chosen threshold value of the lookup table where the average received signal power is greater than or equal to the chosen threshold value and where the average received signal power is less than all threshold values in a set of a plurality of threshold values larger than the chosen threshold value;
    when each threshold value of the plurality of threshold values is less than the average received signal power value, selecting a maximum subchannel step size; and
    when each threshold value of the plurality of threshold values is greater than the average received signal power, selecting a minimum subchannel step size.

13. A method for realizing a frequency-domain equalizer in a Discrete Multitone (DMT) communications system comprising the steps of:
    generating a lookup table comprising a plurality of step sizes and a plurality of threshold values; said step of generating comprising the steps of:
        selecting a signal to noise ratio gap value responsive to a received signal power and a tone group for a target channel of a DMT transceiver;
        selecting a design margin value consistent with said DMT transceiver characteristics and in accordance with said signal to noise ratio gap value;
        selecting a coding gain value corresponding to a signal to noise ratio of said received signal power;
        calculating a baseband equivalent noise standard deviation value of a subchannel of said target channel;
        selecting a signal to noise ratio loss value, said value corresponding directly to a misadjustment parameter of a Least Means Squared (LMS) calculation; and
        selecting a subchannel equivalent gain value of said subchannel;
    calculating a received signal power accumulation;
    calculating an average received signal power; and
    selecting a subchannel step size according to a decision policy;
        comparing the average received signal power to the plurality of threshold values;
        when a threshold value of the plurality of threshold values is greater than the average received signal power value, selecting the subchannel step size associated with a chosen threshold value of the lookup table where the average received signal power is greater than or equal to the chosen threshold value and where the average received signal power is less than all threshold values in a set of a plurality of threshold values larger than the chosen threshold value;
        when each threshold value of the plurality of threshold values is less than the average received signal power value, selecting a maximum subchannel step size; and
        when each threshold value of the plurality of threshold values is greater than the average received signal power, selecting a minimum subchannel step size.

14. The method of claim 13 wherein each step size of the plurality of step sizes is associated with one threshold value of the plurality of threshold values, and where each threshold value of the plurality of threshold values is associated with a single step size of the plurality of step sizes.

15. The method of claim 13 wherein each step size of the plurality of step sizes is approximated by an integer power of two.

* * * * *